(No Model.)
J. A. GROSHON.
THREE-WAY VALVE.
No. 261,224. Patented July 18, 1882.
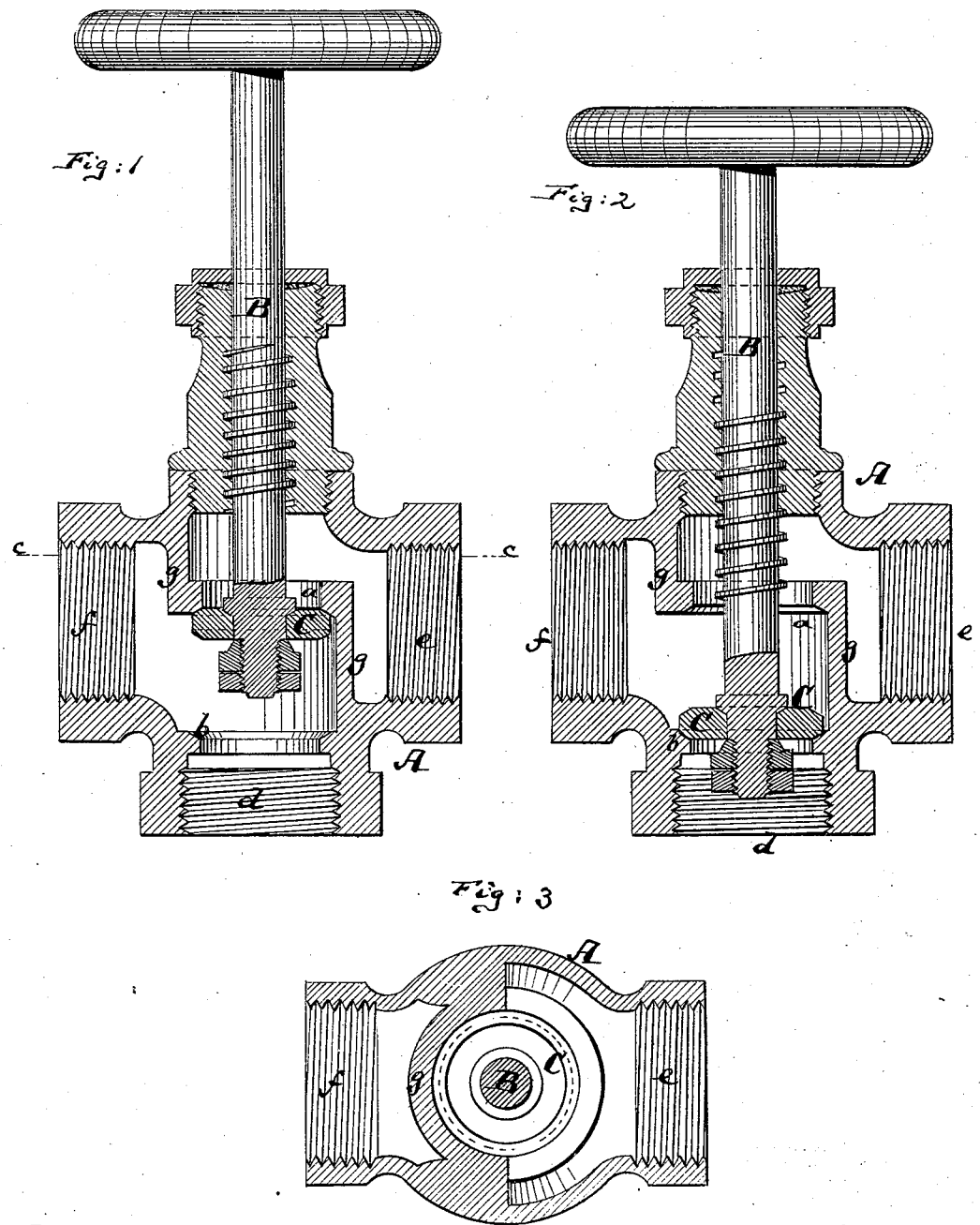
Witnesses
John C. Tunbridge
Henry F. Parker
Inventor:
John A. Groshon
by his attorneys
Briesen & Betts

UNITED STATES PATENT OFFICE.

JOHN A. GROSHON, OF NEW YORK, N. Y., ASSIGNOR TO THE McNAB & HARLIN MANUFACTURING COMPANY, OF SAME PLACE.

THREE-WAY VALVE.

SPECIFICATION forming part of Letters Patent No. 261,224, dated July 18, 1882.

Application filed February 18, 1882. (No model.)

*To all whom it may concern:*

Be it known that I, JOHN A. GROSHON, of New York, in the county and State of New York, have invented a new and Improved Valve, of which the following is a specification.

Figures 1 and 2 are vertical central sections of my improved valve. Fig. 3 is a cross-section on the line $c\ c$, Fig. 1.

The object of this invention is to produce a valve that will regulate connection between three pipes; and the invention consists in combining the valve with two valve-seats in such manner that when it is on one of the seats it will close communication between two pipes—say the supply-pipe and two discharge-pipes—when off both seats will establish communication between the supply-pipe and both discharge-pipes, and when on the second seat will establish communication between two pipes—say the supply-pipe and another of the discharge-pipes.

The invention is applicable to pipes leading from steam-boilers to their engines and condensers, also to water-pipes, gas-pipes, and the like.

In the drawings, the letter A represents the shell of the valve. B is the stem of the valve, and C the body of the valve, which body is preferably of circular form with beveled faces. Within the shell are formed two seats, $a$ and $b$, for the valve C. The seat $a$ is above the valve and the seat $b$ below it. The stem B can be screwed or otherwise moved up or down so as to carry and hold the valve either against the upper seat, $a$, as in Fig. 1, or against the lower seat, $b$, as in Fig. 2, or suspended midway between the two seats. The seat $b$ is formed at the junction with the shell A of a branch pipe, $d$, which is at right angles with two other pipes, $e$ and $f$, that join the shell A. The seat $a$ is formed in an angular partition, $g$, that separates the pipe-connection $e$ from the pipe-connection $f$. Now, supposing the connection $e$ to lead to the supply-pipe, the supply is entirely stopped when the valve is raised against the seat $a$, as in Fig. 1; but when the valve is entirely lowered against the seat $b$ communication between the pipes $e$ and $f$ is established, and when the valve is suspended midway between its two seats communication between the pipes $e$ and $d$, and also between $e$ and $f$, is established. Thus I can regulate the supply of steam or other liquid to one or both of two pipes that join the supply-pipe. The same valve will also be equally operative if the pipe $d$ were the supply-pipe. In this case the valve would shut off all communication when in the position shown in Fig. 2, would establish communication between $d$ and $f$ when in the position shown in Fig. 1, and would establish communication between $d$ and $e$, and also between $d$ and $f$, when suspended midway between the two seats. If $f$ is the supply-pipe, the valve will regulate the distribution to pipes $e$ and $f$, but will never entirely close the supply.

I claim—

The combination of the shell A, having three pipe-connections, $d$, $e$, and $f$, and two aligned valve-seats, $a$ and $b$, with the valve-stem B and valve C, said valve being adapted to bear against either of said seats, substantially as and for the purpose specified.

This specification of my invention signed this 14th day of February, 1882.

JOHN A. GROSHON.

Witnesses:
JULIUS HUELSEN, Jr.,
WILLIAM H. C. SMITH.